US012313029B2

(12) United States Patent
Canal Vila et al.

(10) Patent No.: US 12,313,029 B2
(45) Date of Patent: May 27, 2025

(54) DEVICES AND METHODS FOR MITIGATING VIBRATIONS IN WIND TURBINE BLADES

(71) Applicant: LM WIND POWER A/S, Kolding (DK)

(72) Inventors: Marc Canal Vila, Barcelona (ES); Andreas Herrig, Garching (DE); Santiago Tomas Monpol, Barcelona (ES)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/291,210

(22) PCT Filed: Jul. 22, 2022

(86) PCT No.: PCT/EP2022/070663
§ 371 (c)(1),
(2) Date: Jan. 22, 2024

(87) PCT Pub. No.: WO2023/002033
PCT Pub. Date: Jan. 26, 2023

(65) Prior Publication Data
US 2024/0360812 A1    Oct. 31, 2024

(30) Foreign Application Priority Data
Jul. 23, 2021 (EP) .................... 21382682

(51) Int. Cl.
*F03D 1/06* (2006.01)
*F03D 80/50* (2016.01)

(52) U.S. Cl.
CPC ......... *F03D 1/0658* (2013.01); *F03D 1/0675* (2013.01); *F03D 80/502* (2023.08); *F05B 2260/96* (2013.01)

(58) Field of Classification Search
CPC .... F03D 1/06495; F03D 1/0675; F03D 80/50; F03D 80/502
See application file for complete search history.

(56) References Cited

U.S. PATENT DOCUMENTS

| 9,316,202 | B2 * | 4/2016 | Bech | F03D 80/00 |
| 9,964,095 | B2 * | 5/2018 | Pfeiffer | F03D 1/0658 |
| 10,288,039 | B2 * | 5/2019 | Chen | F03D 80/50 |

(Continued)

FOREIGN PATENT DOCUMENTS

| EP | 3795824 A1 | 3/2021 |
| GB | 2475865 A | 6/2011 |
| WO | 2016/107624 A1 | 7/2016 |

*Primary Examiner* — Brian P Wolcott
*Assistant Examiner* — John S Hunter, Jr.
(74) *Attorney, Agent, or Firm* — Nath, Goldberg & Meyer; Jerald L. Meyer; Tanya E. Harkins

(57) ABSTRACT

A device and method for reducing vibrations in a wind turbine with a rotor in standstill are provided. The device includes a portion configured to protrude beyond a leading edge of a wind turbine blade. The device includes a portion configured to protrude beyond the leading edge of the wind turbine and may be releasably attached around the wind turbine blade substantially along a chordwise direction. The device may be detached from the wind turbine blade before the wind turbine starts to operate.

16 Claims, 8 Drawing Sheets

(56) References Cited

U.S. PATENT DOCUMENTS

| | | | | |
|---|---|---|---|---|
| 10,337,540 B2 * | 7/2019 | Wardropper | ............ | F03D 80/50 |
| 11,484,957 B2 * | 11/2022 | Grishauge | ............... | B25B 1/205 |
| 11,867,156 B2 * | 1/2024 | Herrig | ..................... | F03D 80/50 |

* cited by examiner

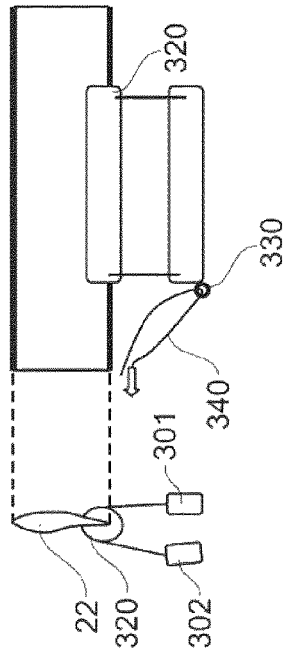
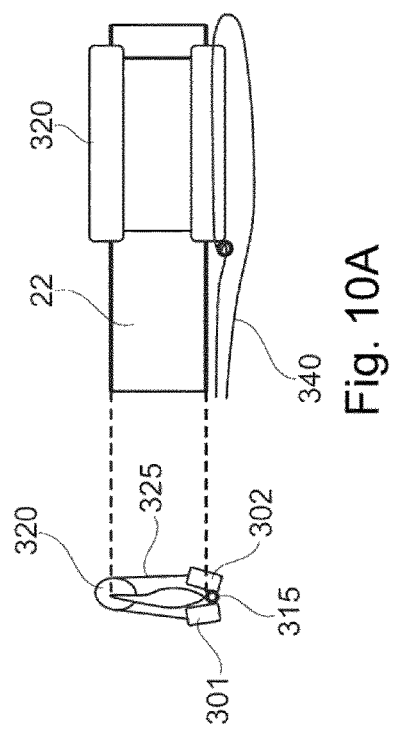
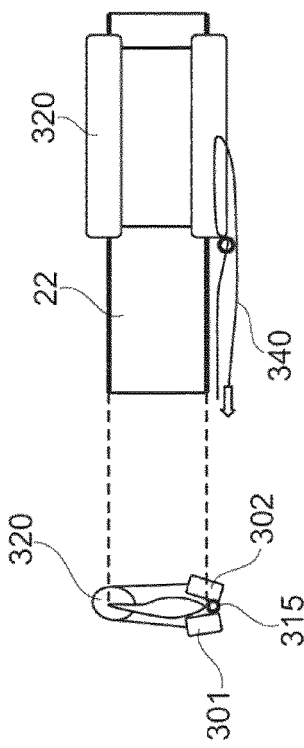
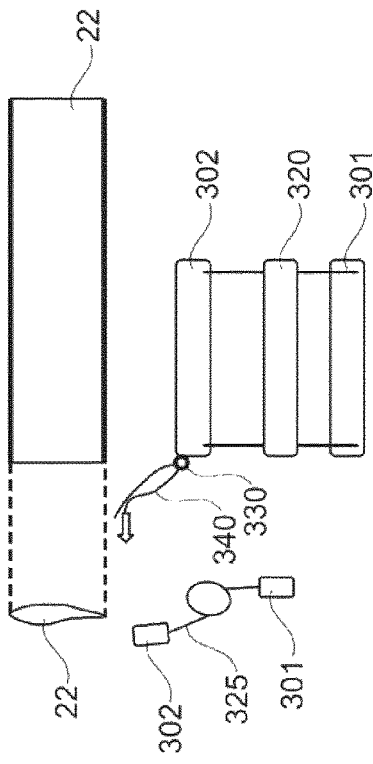

DEVICES AND METHODS FOR MITIGATING VIBRATIONS IN WIND TURBINE BLADES

This is a National Phase Application filed under 35 U.S.C. 371 as a national stage of PCT/EP2022/070663, filed Jul. 22, 2022, an application claiming benefit of European Application No. 21382682.9, filed Jul. 23, 2021, the content of each of which is hereby incorporated by reference in its entirety.

The present application claims the benefit of EP21382682.9 filed on Jul. 23, 2021.

The present disclosure relates to devices for wind turbine blades and methods for reducing vibrations in wind turbines. More particularly, the present disclosure relates to devices for mitigating vortex induced vibrations and stall induced vibrations, and methods for reducing wind turbine vibrations when the wind turbine is parked, especially during wind turbine installation and/or maintenance.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

There is a trend to make wind turbine blades increasingly longer to capture more wind and convert the energy of the wind into electricity. That makes blades more flexible and more prone to vibrations of the blades. Wind turbine blades vibrating excessively may get damaged. Vibrations of the rotor blades may also result in the whole wind turbine structure oscillating e.g. fore-aft oscillations, or sideways oscillations. Vibrations in the wind turbine blade may also damage other components of the wind turbine due to excessive stress.

When the wind turbine is in operation (i.e. producing energy and connected to an electrical grid), a wind turbine controller may operate auxiliary drive systems such as a pitch system or a yaw system to reduce or change loads on the blades. This way, vibrations of the blades may be counteracted. However, the problem of vibrations can be serious as well in circumstances when the wind turbine is parked and disconnected from the grid.

When a wind turbine is parked, the wind may blow against the wind turbine from unusual directions, i.e. different from when in normal operation. The airflow around the wind turbine may cause the wind turbine to vibrate. Vibrations may stress and even damage one or more wind turbine components, which may compromise the performance of the wind turbine, can increase the need of reparations and reduce the lifespan of the wind turbine. As an orientation of a wind turbine blade cannot be adapted to the direction of the incoming wind, e.g. through yawing and/or pitching as opposed to when the wind turbine is operating, the effects of vibrations may be greater or different when the wind turbine is parked than when the wind turbine is operating normally and producing energy.

In particular, this may apply when the wind turbine is being installed or commissioned. For example, it may happen that an incomplete rotor is installed (e.g. a rotor having a single blade or two blades out of the total of three blades). The remaining blades may not be installed until a few days or a week later. In the meantime, the partially installed (or "incomplete") rotor may be in standstill. The rotor may or may not be locked, and the wind turbine can be exposed to varying wind conditions. This may likewise apply if the wind turbine is stopped during several hours, days or weeks, e.g. for maintenance reasons. A wind turbine blade can start to vibrate in any of these conditions depending particularly on the direction of the wind.

SUMMARY

In an aspect of the present disclosure, a device configured to be removably mounted to a wind turbine blade having a root, a tip and exterior surfaces defining a pressure side, a suction side, a leading edge and a trailing edge, each surface extending in a generally spanwise direction from the root to the tip, is provided. The device is configured for mitigating vibrations when a rotor of a wind turbine is in standstill. The device comprises a portion configured to protrude substantially in a local chordwise direction beyond the leading edge of the wind turbine blade. The device is configured to be attached around the blade substantially along a local chordwise direction.

According to this aspect, the portion configured to protrude from the leading edge may change the air flowing around the wind turbine blade once attached to it, and avoid, or at least reduce, vortex and/or stall induced vibrations.

Throughout the present disclosure, the terms "standstill" and "parked" are used interchangeably, and may be understood as a situation in which the wind turbine is not producing electricity, and the rotor is substantially standing still. The rotor may or may not be locked in standstill. For instance, a wind turbine may be parked or in standstill during installation and/or commissioning. A wind turbine may also be parked for e.g. maintenance reasons after operating normally, i.e. producing energy, or in case of a prolonged grid loss.

Throughout the present disclosure, protruding beyond the leading edge in a local chordwise direction may mean that a portion configured to protrude beyond the leading edge is arranged in front of the leading edge. In some examples, the protruding portion may extend along an axis having an angle α between −20° to +20° with a local chord, more in particular between −10° and +10°, and more in particular between −5° and +5°. Such angle may be measured in a plane including a local chordwise direction and substantially perpendicular to a local leading edge direction. A local chordwise direction may therefore represent 0°.

In a further aspect of the disclosure, a method for mitigating vibrations of a parked wind turbine comprising one or more wind turbine blades is provided. A wind turbine blade comprises a root, a tip and exterior surfaces defining a pressure side, a suction side, a leading edge and a trailing edge, each surface extending in a generally spanwise direction from the root to the tip. The method comprises releasably attaching a device comprising a portion configured to protrude substantially in a local chordwise direction beyond the leading edge of the wind turbine blade around a wind turbine blade along a local chordwise direction.

Still in a further aspect of the disclosure, a method for detaching a device from a leading edge of a wind turbine, the device comprising a suction side piece and a pressure side piece, each side piece including a portion configured to protrude substantially in a chordwise direction beyond the leading edge, is provided. The method comprises pulling a release rope for separating the pressure side and suction side pieces when the leading edge is pointing downwards or upwards before starting to operate the wind turbine.

BRIEF DESCRIPTION OF THE DRAWINGS

FIGS. 10A-10E schematically illustrate cross-sectional views and side views of an example of how the device of FIGS. 4A and 4B may be unmounted from a wind turbine blade.

DETAILED DESCRIPTION OF EXAMPLES

Figure 1:
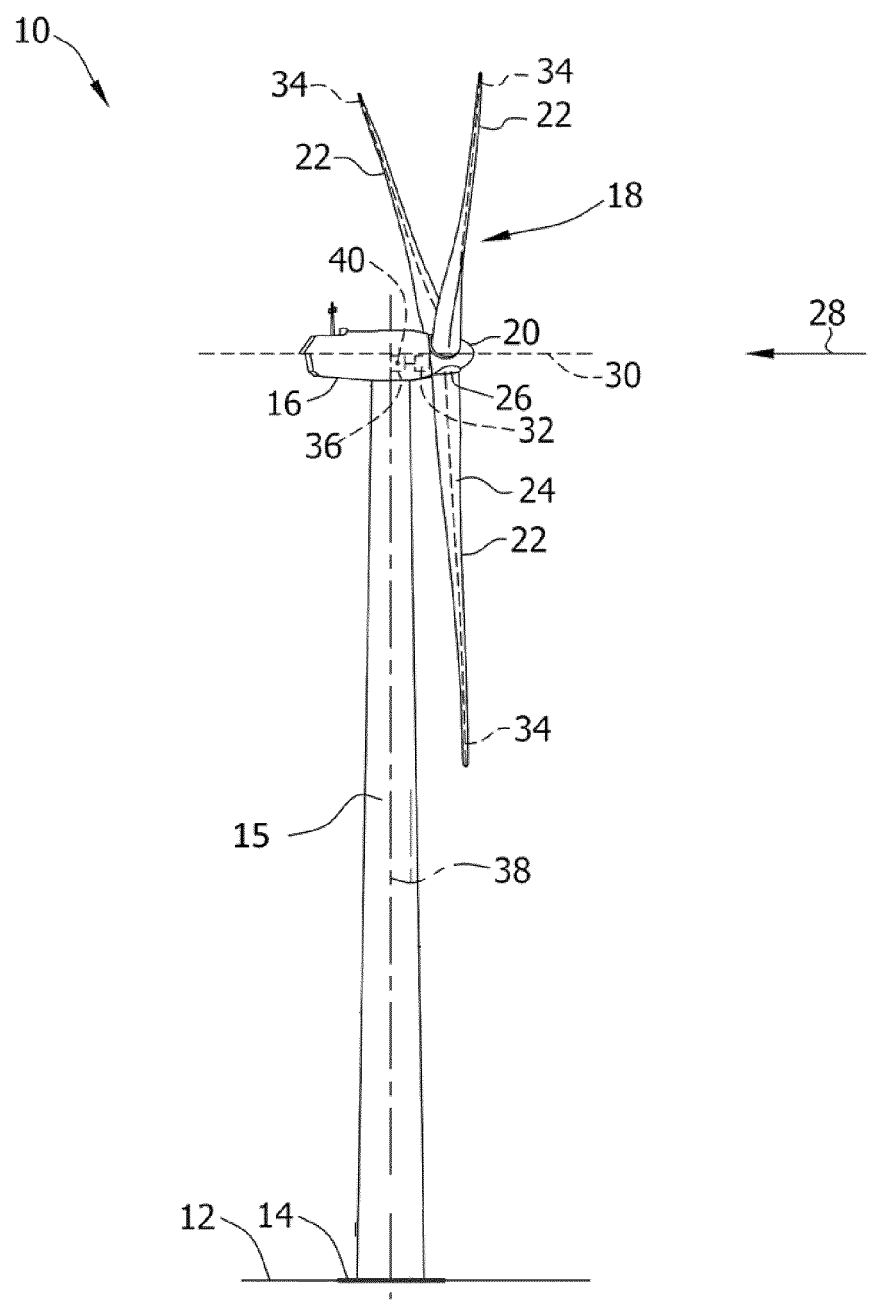
FIG. 1 illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
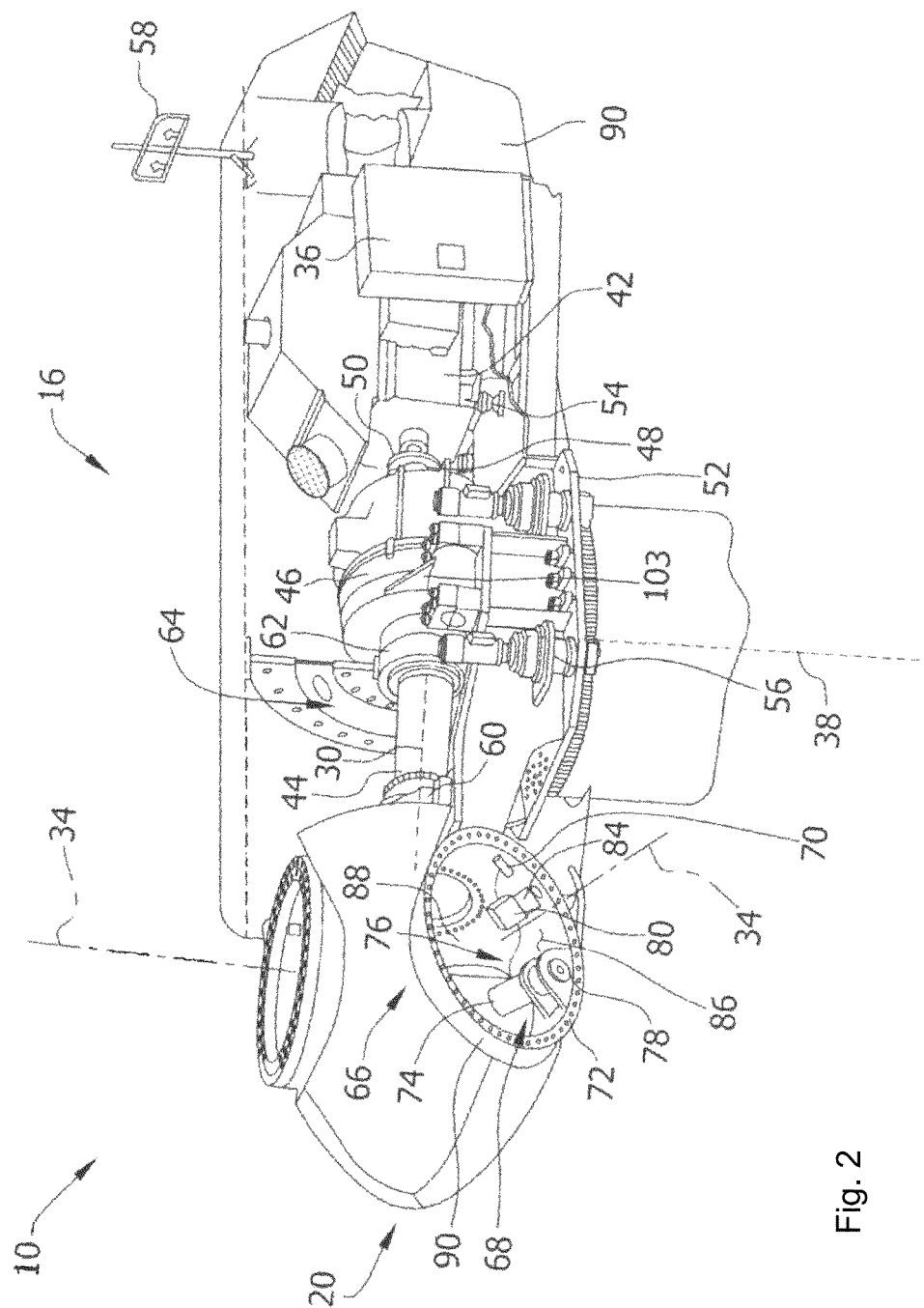
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400 V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
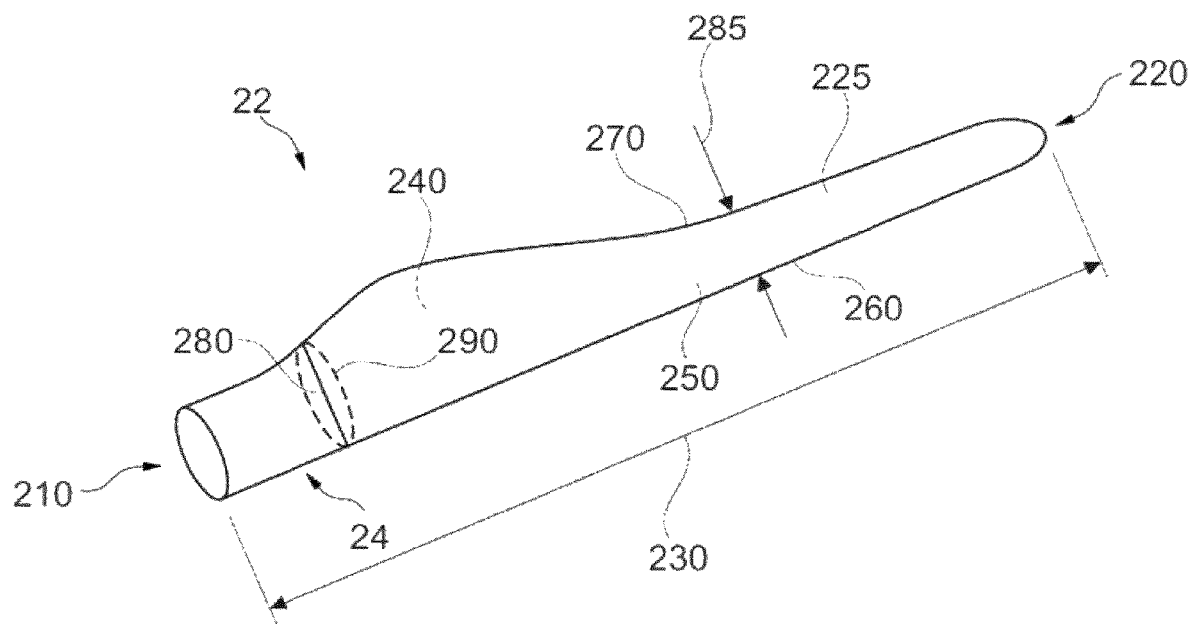
FIG. 3 illustrates a schematic perspective view of a wind turbine blade shown in FIG. 1.

A schematic perspective view of a wind turbine blade 22, e.g. one of the rotor blades 22 shown in FIG. 1, is illustrated as an example in FIG. 3. The rotor blade 22 includes a blade root 210, a blade tip 220, a leading edge 260 and a trailing edge 270. The blade root 210 is configured for mounting the rotor blade 22 to the hub 20 of a wind turbine 10. The wind turbine blade 22 extends lengthwise between the blade root 210 and the blade tip 220. A span 230 defines a length of the rotor blade 22 between said blade root 210 and blade tip 220. A chord 280 at a given position of the blade is an imaginary straight line joining the leading edge 260 and the trailing edge 270, the cross-section generally having airfoil shaped cross-section. As is generally understood, a chordwise direction is substantially perpendicular to a spanwise direction. Also, the chord 280 may vary in length 285 as the rotor blade 120 extends from the blade root 210 to the blade tip 220. The wind turbine blade 22 also includes a pressure side 240 and a suction side 250 extending between the leading edge 260 and the trailing edge 270. A tip region 225 may be understood as a portion of a wind turbine blade 22 that includes the tip 220. A tip region may have a length of 33%, 30%, or 25% of the span or less. A root region 24 may be understood as a portion of the blade that includes root 210. A root region may have a length of e.g. 33%, 30% of the span or less.

The rotor blade 22, at different spanwise positions, has different aerodynamic profiles and thus can have airfoil shaped cross-sections 290, such as a symmetrical or cambered airfoil-shaped cross-section. Close to a root of the blade, the cross-section of the blade may be rounded, even circular or almost circular. Closer to a tip of the blade, the cross-section of the blade may be thinner and may have an airfoil shape.

When a wind turbine is parked or stopped, vibrations caused by the air flowing around the wind turbine, in particular around the wind turbine blades, may stress and damage the wind blades and the wind turbine. The wind turbine rotor may or may not be locked in these situations.

At least two types of oscillations or vibrations may happen particularly when the turbine is parked. The first ones are so-called vortex induced vibrations (VIVs), and may arise when an angle of attack for a blade or airfoil portion is around 90 degrees. Vortex shedding may contribute to enhance the wind turbine blade oscillation. The second type of oscillations are stall induced vibrations (SIVs), and may arise when the angle of attack is close to stall angles (e.g. −30 degrees to +30 degrees). The angle of attack may be understood as a geometrical angle between a flow direction of the wind and the chord of a rotor blade or a local chord of a rotor blade section.

FIGS. 4A to 5B schematically show different examples of devices for reducing vibrations in a wind turbine. Any of these devices 300 is suitable for mitigating vibrations of a wind turbine 10 during standstill of the rotor. A device 300 comprises a portion 310 configured to protrude substantially in a local chordwise direction beyond a leading edge 260 of the wind turbine blade 22. A device 300 is configured to be attached around the blade substantially along a local chordwise direction.

Devices 300 as described herein may reduce vibrations when the wind turbine is parked. The performance of the wind turbine is not negatively affected as the device is normally removed before the wind turbine starts normal operation. Devices 300 may be particularly useful during installation and/or commissioning of a wind turbine. They may also be useful if the wind turbine is stopped, e.g. for maintenance.

Figure 4A:
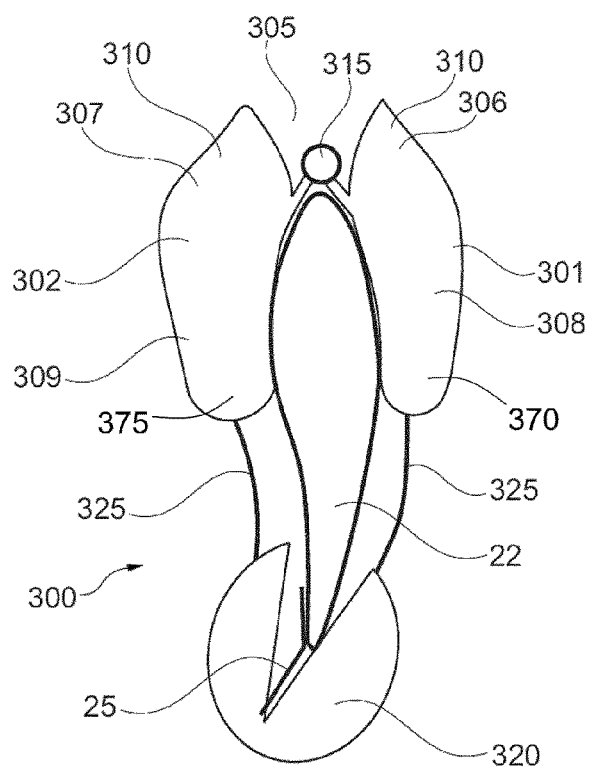
FIGS. 4A and 5A schematically illustrate cross-sectional views of examples of devices for mitigating vibrations placed on a wind turbine blade.
Figure 4B:
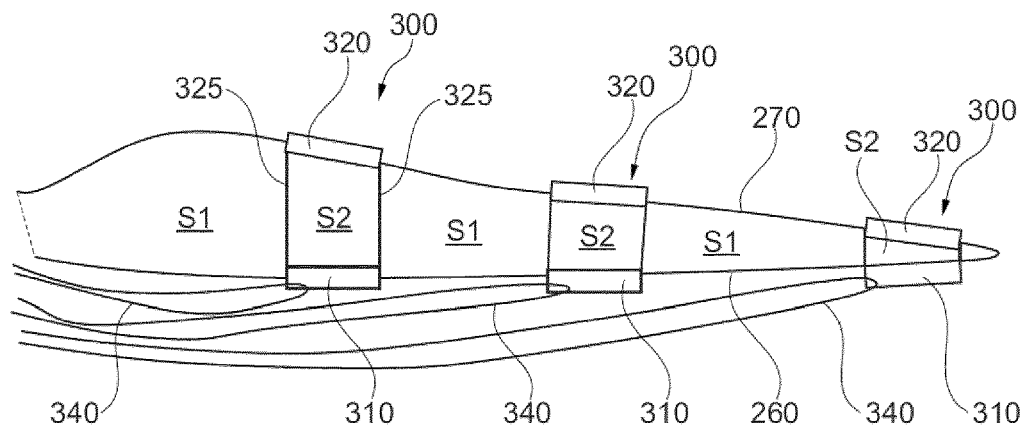
FIGS. 4B and 5B schematically illustrate top views of the devices and blades of FIGS. 4A and 5A.

FIG. 4A schematically illustrates a cross-sectional view of a device 300 arranged around a wind turbine blade 22. FIG. 4B schematically illustrates a top view of a blade 22 with three devices 300 similar to the one illustrated in FIG. 4A attached to the blade 22.

A device 300 may comprise a suction side piece 301 and a pressure side piece 302. The suction side piece is configured to be arranged on the suction side 250 of the wind turbine blade and the pressure side piece is configured to be arranged on the pressure side 240 of the wind turbine blade 22, as illustrated in FIG. 4A. In this example, both of the suction side and pressure side pieces comprise a portion 310 configured to protrude beyond the leading edge 260.

The suction and pressure side pieces may create a contour or profile of the leading edge 260 which varies along the leading edge. i.e., the contour of the leading edge becomes irregular with one or more of these devices 300 arranged on the blade 22. Therefore, the frequency at which vortices are shed may vary between blade sections, i.e. portions of the blade at different spanwise locations, having a device 300 attached and sections which do not. Thus, vibration of contiguous blade sections may happen at different times, and the vibrations of some sections may be compensated with the vibrations of other sections. For example, as illustrated in FIG. 4B, sections S1 without a device 300 may shed vortices at a certain frequency which is different from the frequency at which vortices may be shed from sections S2 having a device 300 attached to blade having a portion 310 protruding from the leading edge 260.

Each of the suction side piece 301 and pressure side piece 302 may have a front projection 306, 307. A front projection may be understood as a portion 310 configured to protrude beyond a leading edge 260 of the wind turbine blade 22. A front projection may be sharp, e.g. it may have sharp, pointed or spiky edges in cross-section. I.e., there may be a certain angle between the surfaces of a front projection, e.g. of less than 90° (degrees). The angle could be about 90° or between 90° and less than 180° in other examples. In some examples, a piece may have a front projection with a triangular or beveled cross section. A front projection may be single beveled or double beveled. If double beveled, the bevel angles of each bevel may be different. In FIG. 4A, the portions configured to protrude beyond the leading edge are sharp, e.g. have sharp edges in cross-section.

A gap 305 may be provided between the front projections 306, 307 of the suction side 301 and pressure side 302 pieces when attached to a blade 22. I.e., a gap 305 extending in a direction substantially perpendicular to a chord and a length of a wind turbine may be provided after connecting the suction side piece 301 and the pressure side piece 302 along the leading edge 260 of the wind turbine blade. The gap may also extend along the leading edge. The pressure 302 and suction 301 side pieces may be configured to this end, e.g. a certain shape of the pieces, and in particular of front projections 306, 307, may be chosen.

Front projections 306, 307 separated by a gap 305 may create a non-aerodynamic contour of a leading edge 260, or at least a less aerodynamic contour with respect to a leading edge without the device 300. A non-aerodynamic contour may be understood as a non-streamlined or bluff body, in particular a body that, as a result of its shape, has separated flow over a substantial part of its surface. Such a contour may increase drag and avoid or reduce lift creation. SIVs may therefore be avoided or at least reduced by device 300. Sharp front projections may increase this effect.

The portion of a piece 301, 302 which is not the front projection 306, 307 may be the main body 308, 309 of the piece. In some examples, the main body may be configured to extend in a chordwise direction, e.g. up to at least 40% of the chord as in FIG. 4A. The main body of the piece may be longer than the front projection of the piece along the chordwise direction. In these examples, the main body may be configured to disrupt crossflow, i.e. air flowing from the root 210 to the tip 220 or from the tip to the root. The main body may have a suitable height (measured perpendicularly to a to a spanwise direction ant to a chordwise direction) to this end. Perturbating crossflow may decorrelate vortex shedding along a length of the blade and may reduce VIVs.

The main body and the front projection of a piece may be about the same length along a chordwise direction in other examples. A piece (both the main body and the front projection) may also extend along a length of the blade, as illustrated in FIG. 4B.

Pieces 301, 302 may be lightweight. They may float on water. A piece 301, 302 may be rigid, i.e. configured to keep its shape. Thus, it may not bend under the action of the incoming wind when placed on a leading edge. Either of the suction and pressure side pieces may be made of foam, rubber or plastic. A piece may have a hollow inside, as a life buoy or rescue can.

Removable attachment 315 between pieces 301, 302, and in particular between front projections 306, 307, may be a zipper or one or more hook-and-loop fasteners, e.g. Velcro™. Other removable attachments are possible. Removable attachment enables using the device 300 more than once.

Device 300 may further comprise a trailing edge piece 320. The trailing edge piece 320 may be configured to be attached to a trailing edge 270. For example, a trailing edge piece may be clamped to the trailing edge, as illustrated in FIG. 4A. The trailing edge piece may be configured to extend along a trailing edge, as shown in FIG. 4B. Trailing edge piece 320 may provide protection against serrations 25 of the trailing edge. It may additionally or alternatively avoid or reduce damages to the serrated edges by the device 300.

A leading edge piece 301, 302 and a trailing edge piece 320 may have a similar or substantially equal length. Herein the length refers to the dimension of the piece configured to extend along the leading edge or the trailing edge.

A trailing edge piece 320 may be rounded, for example as shown in FIG. 4A. A rounded trailing edge piece 320 may change the profile of the trailing edge 370, similarly as the protruding portions 306, 307 do on the leading edge. With regard to the trailing edge, transitions between a relatively sharp, non-round, contour in the absence of a trailing edge piece 320 and a rounded or more rounded contour in the presence of the trailing edge piece 320 occur. This may enhance the effect of varying the frequency of the vortex shedding caused by the protruding portions 306, 307.

A trailing edge piece 320 may be made of foam, or in general of any material suitable for avoiding or reducing damage caused to or by serrations 25.

Pressure and suction side pieces, as well as trailing edge pieces, may also protect a wind turbine blade 22 during transport if the devices 300 are attached to the blade before transporting them to an installation site.

A device 300 may further comprise one or more ropes or straps 325 connecting the suction side piece and the pressure side piece, the one or more ropes or straps being configured to secure the suction 301 and pressure 302 side pieces to a wind turbine blade 22. The straps 325 may enable attaching a device 300 around a blade 22 along a chordwise direction. A strap may be configured to adapt to a certain extent to a contour of the blade 22 in a chordwise direction. A strap 325 may include any suitable tightener mechanism for the securing. For example, ratchet straps may be used.

In an example where a trailing edge piece 320 is absent, two straps 325 may be provided: one connecting a first longitudinal end 370 of a suction side piece 301 to a first (same) longitudinal end of the pressure side piece 302; and another one connecting a second, opposite to the first, longitudinal end 375 of the suction side piece 301 to a second, opposite to the first, longitudinal end of the pressure side piece 302. A strap 325 may be tightened for securing the device 300 to the blade 22. The straps 325 may be substantially aligned along a chordwise direction of the blade once tightened. In some examples, attaching the removable attachment 315 between piece 301 and 302, e.g. along a leading edge 260, may be sufficient for tightening the straps 325.

Similarly, one or more straps 325 may be provided when a trailing edge piece 320 is present. In some examples, a single strap may be used to connect the suction 301 and pressure 302 side pieces, the strap also being in contact with the trailing edge piece 320. In some of these examples, one strap may connect first longitudinal ends 370 of pieces 301 and 302, and another strap may connect second (opposite) longitudinal ends 375 of pieces 301 and 302. In some other examples, a first strap may be provided between the suction side piece 301 and the trailing edge piece 320, and a second strap may be provided between the pressure side piece 302 and the trailing edge piece 320. In some of these examples, two straps may connect first longitudinal ends 370 of pieces 301 and 302, and another two straps may connect second (opposite) longitudinal ends 375 of pieces 301 and 302. This may likewise apply to a device 300 where a trailing edge piece is absent. For example, a strap joined to a longitudinal end 370, 375 of a suction side piece 301 may be configured to be releasably attached to a strap joined to a (same) longitudinal end 370, 375 of a pressure side piece 302. A buckle fastener may be used to join and tighten the two straps around the blade 22.

A strap 325 may be fixedly joined to a suction side 301 and/or pressure side 302 piece in some examples. In other examples, a strap may be releasably joined to a piece 301, 302. I.e., a strap 325 and a piece 301, 302 may be provided as separate elements, and joined to one another when mounting a device 300 to a wind turbine blade 22.

Straps 325 may enable a versatile device 300 which may be secured at any desired position along a blade length. The surface of pieces 301, 302 configured to face a blade surface may not need to completely touch the blade. Partial contact may be sufficient. Accordingly, a device 300 may be used with blade portions with different chord length and curvatures as well as with different wind turbine blades.

A suction or pressure side piece may have an anchor point 330 (see FIGS. 11A-11E). An anchor point may keep a release rope 340 joined to the device 300 at least during the release of the device 300 from a blade 22. An anchor point may be additionally or alternatively provided in a trailing edge piece 320 if present. In such a case, trailing edge piece may have two portions, e.g. suction and pressure side pieces, which may releasably attached; and the suction and pressure side pieces may be attached to one another in a fixed or in a releasable manner.

A device 300 may be configured to extend between a 1% and a 30% of a blade length, and more in particular between 5% and 20%, in some examples. One or more devices 300 may be attached to a wind turbine blade.

Figure 5A:
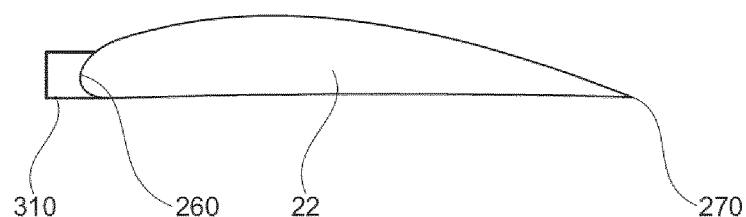
Figure 5B:
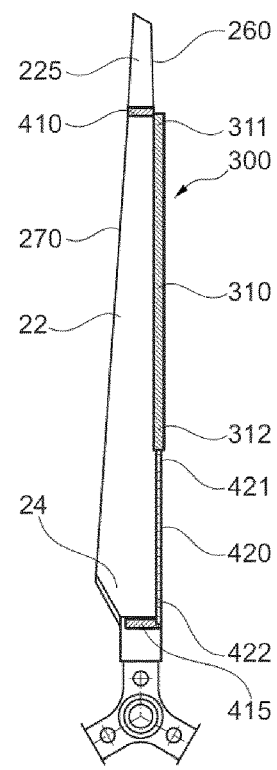

FIGS. 5A and 5B schematically show another example of devices for reducing vibrations in a wind turbine.

In this example, the device comprises a tip fastener 410 attached or attachable to a first longitudinal end 311 of the projection 310 configured to protrude beyond the leading edge 260. The projection 310 is configured to extend from the tip fastener 410 along the leading edge 260. Projection 310 can change the rather rounded contour of the leading edge to a more sharp or angular one. The shape of the projection 310 can be adapted to do so. For example, the projection 310 may be sharp, e.g. it may have sharp edges in cross section. In some examples, the projection 310 may have a squared shape in cross-section. In other examples, the projection 310 may have other non-rounded, and therefore sharp, shapes.

The tip fastener 410 is configured to fit around a tip region 225. The tip fastener 410 may be configured to adapt to a certain extent to a contour of the blade 22 in a chordwise direction. The tip fastener 410 may be provided in an open or a closed state. In an open state, the tip fastener 410 may have two ends which may be joined, e.g. around a blade in a chordwise direction. In a closed state, the tip fastener may be slid around the blade in a longitudinal direction of the blade. The tip fastener 410 may have circular or annular shape when not fastened to the blade. The tip fastener 410 may be a tip ring. The tip fastener 410 may be made of a bendable and robust material. In some examples, the tip fastener 410 may comprise one or more straps.

In some examples, the tip fastener 410 may be provided separately from the projection 310 and they may be joined to the projection 310 when mounting the device 300 to a blade 300.

FIG. 5A shows a cross-sectional view of a wind turbine blade 22 with a substantially squared projection 310 arranged on the leading edge 260. As may be seen in this figure, the projection 310 may have sharp or angular edges in cross section, e.g. about 90°. FIG. 5B shows a top view of a wind turbine blade 22 with a device 300 attached to it. In other examples the projection 310 may be triangular or have any other sharp, non-round, contour.

Vortex shedding may be described by a dimensionless number called the Strouhal number St. The Strouhal number is usually defined as St=f·C/V, where f is the frequency of vortex shedding, C is the characteristic length (for an airfoil it is the projected width perpendicular to the flow direction, for example blade thickness) and V is the air flow speed.

When the frequency of vortex shedding reaches a so-called natural frequency of the wind turbine blade 22, resonance may increase the amplitude of vibrations. Following the formula above, the frequency of vortex shedding may be expressed as a function of the air flow speed as f=St/C·V.

A leading edge, which is substantially rounded, has a Strouhal number St higher than a non-round leading edge, e.g. a leading edge with a projection 310. According to the latest formula, and assuming that the blade with a rounded leading edge and a blade with a non-rounded leading edge have a same characteristic length C, the air flow speed V would need to be higher in the blade having a non-rounded leading edge in order to obtain a frequency of vortex shedding f which is equal for both blades.

Therefore, a blade with a non-rounded edge may require a higher air flow speed V in order to reach a frequency of vortex shedding f equal to a natural frequency of the blade than a blade with a rounded edge. Therefore, a natural frequency for a blade with a non-rounded edge may occur less frequently, thus reducing vortex induced vibrations. Risk of increased amplitude vibration due to resonance may accordingly be reduced.

A projection 310 may also act as a spoiler, increasing drag and therefore delaying stall. Accordingly, SIV risk may also be reduced.

At least the side of the projection 310 which is to contact the leading edge 260 may be made of a soft material, for example of foam. The projection 310 may include rubber or plastic. The fitting of the projection to the blade may be better in this way, and also damage to the blade may be avoided. A soft material, e.g. foam, may enable using device 300 with different blades.

The device 300 may further comprise a handling rope 420 attached or attachable to a second longitudinal end 312 of the projection 310. The second longitudinal end 312 of the projection 310 is opposite to the first longitudinal end 311 of the projection 310. When joined to the leading edge, the second longitudinal end of the projection 310 is closer to the root of the blade and the first longitudinal end of the projection is closer to the tip of the blade.

The handling rope 420 may help to keep the projection 310 fixed to, in contact with or clinging to the leading edge 260. When a handling rope is present 420, a first end 421 of the rope 420 may be attached to the second longitudinal end 312 of the projection 310, and a second opposite end 422 of the rope may be attached to the blade 22, the nacelle 16 or the hub 20. Attachment may be direct, e.g. to an anchor point, or may be indirect, e.g. a fastener connecting the handling rope 420 to the blade, hub or nacelle may be provided.

In some examples, a root fastener 415 may be provided as a fastener to a blade. If the rope 420 is to be attached to the hub or the nacelle, the rope may also be secured to the blade for having the projection 310 fixed or clinging to the blade. A rope retaining element may be provided to this end. The rope retaining element may be provided as part of the device 300 or separately. In some examples, a rope retaining element may be attached to a blade surface and then the retaining element and the rope may be removably attached.

The device may further comprise a root fastener 415 attached or attachable to a second longitudinal end 312 of the projection 310. The root fastener 415 may also be attached or attachable to the handling rope 420 if the handling rope is present. In some examples, the root fastener 415 may be attached or attachable to the second end 422 of the rope, i.e. the end which is not joined or attachable to the projection 310.

A root fastener 415 may be configured to fit around a more central region of the blade or to a root region 24 of the blade. Like the tip fastener 410, the root fastener 415 may have circular or annular shape when not fastened to the blade. The root fastener 415 may be configured to adapt to a contour of the blade 22 in a chordwise direction. The root fastener 415 may be provided in an open state in some examples, but it may be provided in a closed state in other examples. The explanations with regard to the tip fastener are in general applicable to the root fastener.

A projection 310 may be elongated, see FIG. 5B. A projection 310 may be configured to extend along 20 and 60% of the span along the leading edge. A device 300 may be configured to extend between 10% and 90%, in particular between 50 and 80%, along the leading edge. This may particularly apply if a root fastener 415 and a handling rope 420 are used. In some of these examples, the handling rope 420 may be shorter than the projection 310.

In other examples, for instance if the handling rope 420 is to be attached to the hub or the nacelle, the handling rope may be longer than the projection 310. In these examples, a root fastener 415 may be present or may be absent.

Once mounted to a blade 22, projection 310 may be in part loose. The surface of projection 310 configured to face a blade surface may not need to completely touch the blade, in particular during use. As projection 310 may be secured by its ends, it may move with respect to the blade, e.g. separate from the leading edge 260, when subjected to an air flow. Such movement may add drag and may therefore help in damping vibrations, both VIVs and SIVs.

A wind turbine blade (22) comprising one or more devices (300) according to the examples of FIGS. 4A-4B or one or more devices according to the examples of FIGS. 5A and 5B may be provided. A wind turbine (10) comprising one or more of such wind turbine blades (22) may also be provided.

In another aspect, a method 500 for mitigating vibrations of a parked wind turbine comprising one or more wind turbine blades, a blade having a root, a tip and exterior surfaces defining a pressure side, a suction side, a leading edge and a trailing edge, each surface extending in a generally spanwise direction from the root the tip, is provided. A wind turbine may be parked during installation, commissioning and maintenance of the wind turbine.

Figure 6:
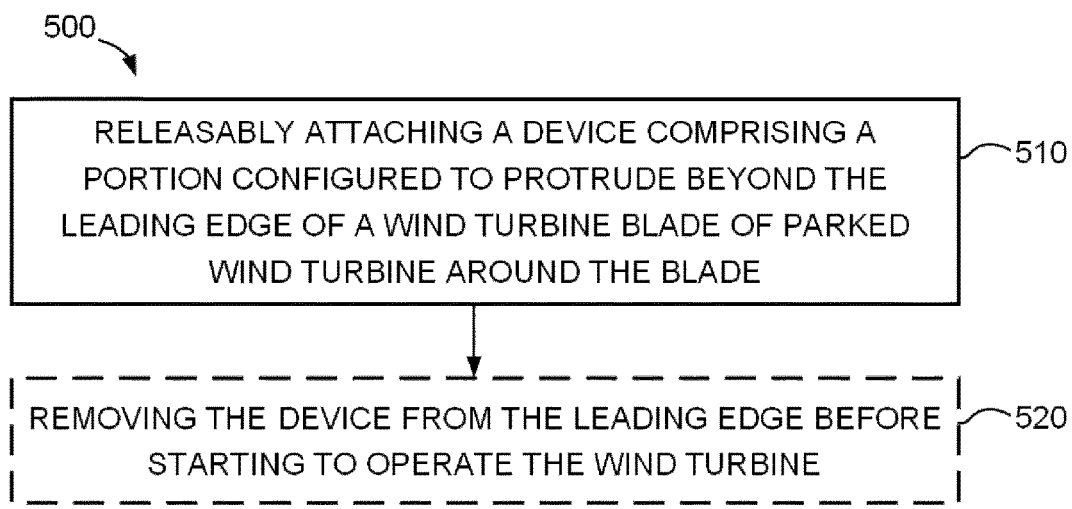
FIG. 6 schematically illustrates a flow chart of a method for mitigating vibrations of a parked wind turbine.

As illustrated in FIG. 6, the method comprises, at block 510, releasably attaching a device 300 comprising a projection 310 configured to protrude substantially in a local chordwise direction beyond the leading edge 260 of a wind turbine blade 22 around a wind turbine blade 22 along a chordwise direction.

Method 500 may further include, at block 520, removing the device from the blade before starting to operate the wind turbine. As disclosed herein, several methods for releasably attaching one or more devices to the leading edge, and for remove them later on, are possible. As this step is optional, it has been indicated in a dashed box in FIG. 7.

Any of the devices described with respect to FIGS. 4A to 7B may be releasably attached to the blade. When mounted to a wind turbine blade, the VIVs and/or SIVs acting on the wind turbine blade 22, and in general on the wind turbine 10, may be mitigated.

In some examples, releasably attaching may comprise at least one of surrounding the wind turbine blade 22 with the device and sliding the device 300 around the wind turbine blade.

An example of attaching a device 300 by surrounding the wind turbine blade 22 with it is provided in FIGS. 7A-7D. FIGS. 7A-7D schematically show cross-sectional views of a blade 22 and a device 300 according to the description related to FIGS. 4A and 4B being mounted to the blade 22.

Figure 7A:
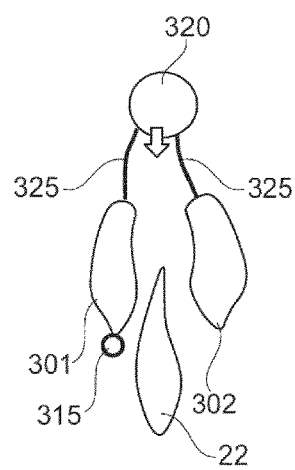
FIGS. 7A-7D schematically illustrate cross-sectional views of an example of how the device of FIGS. 4A and 4B may be mounted to a wind turbine blade.
Figure 7B:
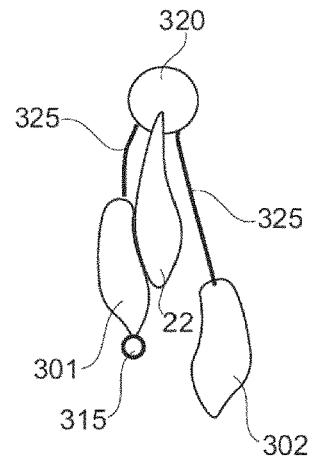
Figure 7C:
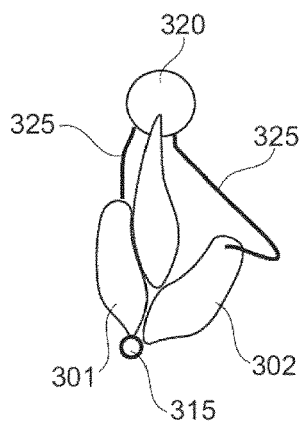
Figure 7D:
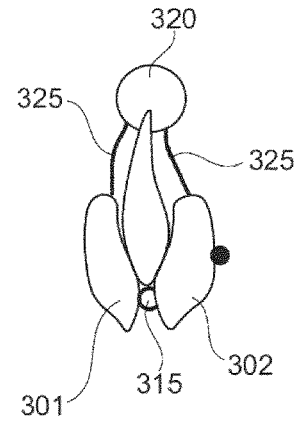

As illustrated in FIG. 7C, surrounding the blade may comprise joining the suction 301 and pressure 302 side pieces via removable attachment 315 along the leading edge 260. A zipper or a hook-and-loop fastener like Velcro™ may be used. Then, if necessary, one or more straps or ropes 325 may be tightened in order to secure the device 300 to the blade 22, see e.g. FIG. 7D. The one or more straps 325 may connect the suction and pressure side pieces over the trailing edge 270 along a substantially chordwise direction.

In FIGS. 7A and 7B, an open device 300 may be arranged on top of a trailing edge 270 which points upwards, e.g. on top of a horizontal wind turbine blade 22 with the trailing edge 270 pointing upwards, such that a suction side piece 301 is placed on (or near) the suction side of the blade, and a pressure side piece 302 is placed on (or near) the pressure side of the blade. An open device may be herein understood as a device having the suction and pressure side pieces not joined to one another.

Upwards may for example be vertically upwards. This may facilitate mounting the device 300 to the blade 22, but it is not necessary that the trailing edge points exactly vertically upwards. The blade position may be such that a chordwise direction may have a certain angle with a vertical direction in some examples. For example, an angle between 0 and less than 10° or 20° (or between −20° or −10° and 0°) with an axis substantially parallel to a chordwise direction may be possible.

Likewise, the blade may not need to be positioned horizontally, but doing so may facilitate installation of the device 300. In some examples, a spanwise direction of the blade may have a certain angle with a horizontal direction, e.g. an angle between 0 and 5 or 10°.

Horizontally may refer to a three or nine o'clock position of the blade if the blade is already mounted to the hub 20, for example if the device 300 is mounted to a rotor installed atop a wind turbine tower.

One or more devices 300 may be releasably attached to a wind turbine blade before the blade is joined to the hub 20 or lifted to be joined to a hub already mounted on top of a tower 100. One or more devices 300 may be releasably attached to a wind turbine blade when the blade 22 is already joined to a hub 20 on top of a tower 100.

If the device 300 comprises a trailing edge piece 320, the trailing edge piece 320 may be placed over the trailing edge and the suction 301 and pressure 302 side pieces may be placed in the corresponding side of the blade.

A release rope 340 may be passed through an anchor point 330 (see FIGS. 11A-11E) and between the suction 301 and pressure 302 side pieces. If the device is mounted on a support surface, e.g. the ground 12, this may be performed before installing the blade 22 or the rotor 18 on top of the tower 100. Passing the rope 340 between the suction side 301 and pressure 302 side pieces may enable separating the pieces 301, 302 when pulling the rope 340. The anchor point 330 (see FIGS. 10A-10E) may keep the release rope 340 and a piece 301, 302 connected once the pieces have been separated, which may help to control the lowering of the device 300. The anchor point 330 may be in a (longitudinal) end of a suction side or pressure side piece, e.g. in a front projection 306, 307.

More than one device 300 may be mounted to a wind turbine blade 22 in this way. For example, between 2 and 5 devices 300 may be placed on a blade 22 for mitigating vibrations of a parked wind turbine.

In some examples, the removable attachment 315 may be located in the trailing edge piece 320. In these examples, the pressure and suction side pieces may be non-detachably connected or detachably connected. The pressure and suction side pieces may be placed around the leading edge and the device 300 may be joined to the blade 22 by closing a releasable attachment in the trailing edge piece. One or more straps, e.g. ratchet straps, may be used to adjust, e.g. tighten, the device 300 to the blade.

In some examples, a device 300 may be installed on a blade before transporting the blade 22 to an installation site. At least a portion of the leading edge of the blade, and optionally of the trailing edge, may be protected from damage during transportation.

Figure 8:
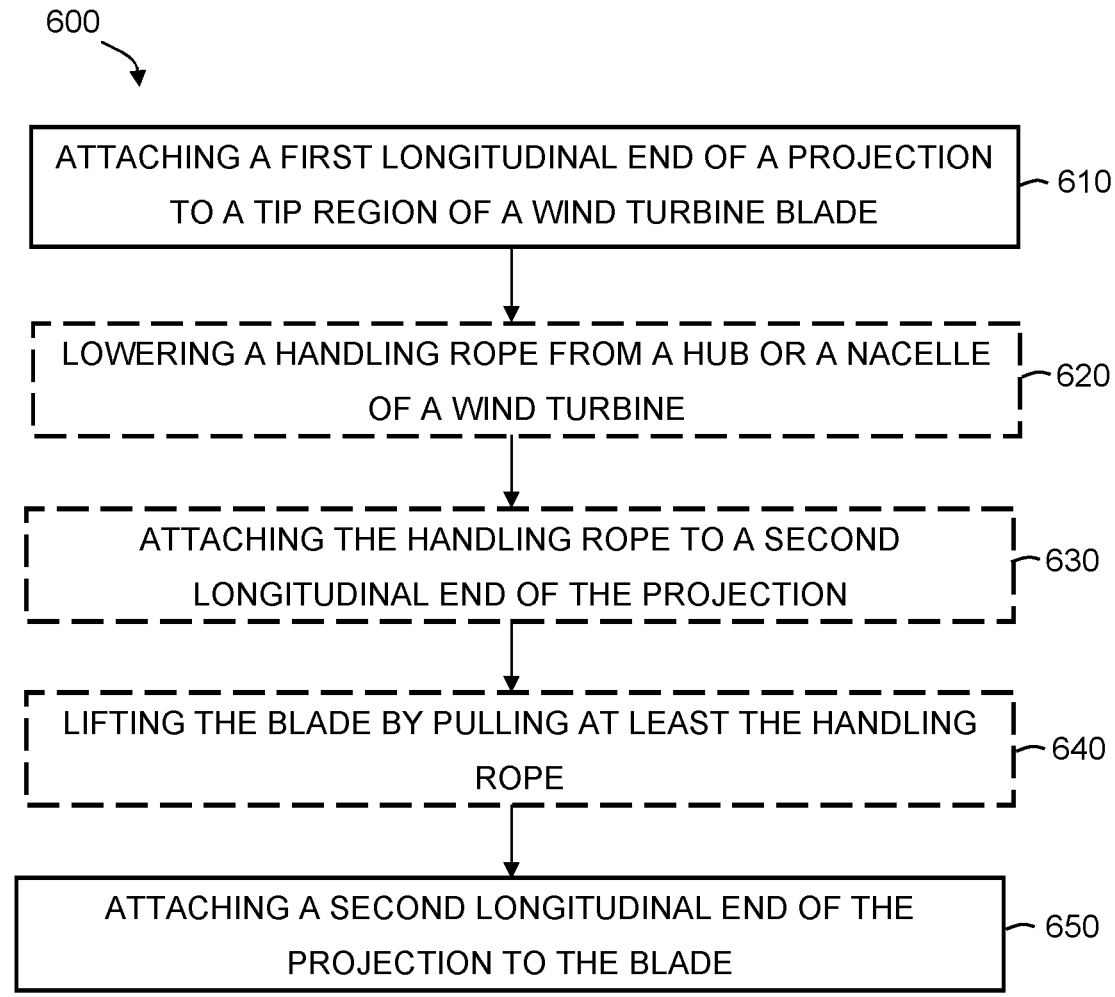
FIG. 8 schematically illustrates a flow chart of an example of how the device of FIGS. 5A and 5B may be mounted to a wind turbine blade.

An example of a method 600 for attaching a device 300 by surrounding the wind turbine blade 22 with it and/or sliding it around the wind turbine is provided in FIG. 8. The steps indicated below may particularly apply to the device described with respect to FIGS. 5A and 5B.

The method comprises, at block 610, arranging (attaching) a tip fastener 410 around a tip region 225 of the blade 22 along a substantially chordwise direction for attaching a first longitudinal end 311 of the projection 310 configured to protrude beyond the leading edge. The tip fastener 410 may be already connected to the projection 310 before arranging it around the blade in some examples, but in other examples the tip fastener and the portion may be joined when the tip fastener is arranged, e.g. fastened, around the blade.

The tip fastener 410 may be fastened by joining two portions of the tip fastener 410 in some examples. For example, this may be easily performed when the device 300 is attached to a blade 22 on the ground. The blade may be in a substantially horizontal position for fastening the tip fastener 410 around it.

In some other examples, the tip fastener 410 may be slid around the tip region 225. The tip fastener may therefore be in a closed position. The tip fastener may be slid up to a point in which it grips the blade and beyond which it cannot continue sliding. For example, a radius of the tip fastener may become substantially equal to a chord of the blade. Sliding the tip fastener 410 may be performed before lifting the blade on a wind turbine tower.

The blade may be in a substantially vertical position for sliding the tip fastener 410 around it in some examples. For example, a lifting device such as a crane may lift the wind turbine blade by its root or a root region 24 such that the tip is pointing vertically downwards. The tip fastener may be then slid around the blade upwardly.

The method may further comprise, at block 650, attaching, e.g. fastening, a second longitudinal end of the projection 310 to the blade 22, e.g. around a central or a root region 24 of the blade 22. A root fastener 415 may be used in some examples.

The projection 310 may first be extended along the leading edge. Then, a tip fastener and a root fastener may be fastened around the blade for securing the projection 310 to the blade. Alternatively, a fastener, e.g. the tip fastener, may be first attached around the blade, then the projection may be extended along the leading edge, and then the other fastener, e.g. the root fastener, may be attached around the blade. This may for example be performed with the blade in a substantially horizontal position, but the blade could also be in an inclined or vertical position.

If a handling rope 420 is present, the rope 420 attached to a second longitudinal end 312 of the projection 310 may be pulled to cling the projection 310 to the leading edge 260. If provided separately from the projection 310, the handling rope, in particular a first end of the rope 421, may be attached first to a second longitudinal end 312, opposite to the first longitudinal end 311, of the projection 310. This option is represented at block 630.

In some examples, if provided separately from a root fastener 415, the handling rope 420, e.g. a second end of the rope 422, may be attached to the root fastener 415. This may be performed before or after pulling the rope.

Therefore, once the tip fastener 410 secures the first longitudinal end 311 of the projection 310 to a tip region 225, the handling rope 420 may be pulled and the root fastener 415 may be placed around the blade.

In some examples the handling rope 420 may be lowered from a hub 20 or a nacelle 16 at block 620. The rope 420 may be then joined to the projection 310. This may be performed before or after attaching the first longitudinal end 311 of the projection 310 to the blade. A lifting rope may be attached to the tip fastener 410 and the blade may be lifted by pulling, at block 640, both ropes or only the handling rope 420.

It may also be possible to lift the blade by pulling from at least the handling rope but without lowering the rope 420 from the hub or the nacelle. For example, the rope 420 may be attached to the elongated projection 310 on the ground and then the rope 420 may be pulled upwardly.

The handling rope 420 may be directly or indirectly attached to a portion of the blade 22. Direct attachment may include attaching the rope 420 to an anchor point of the blade. Indirect attachment may include attaching the rope to the blade by a fastener, e.g. a rope retaining element. A root fastener 415 may be a rope retaining element in some examples. Attaching the handling rope to the blade may be considered as an implementation of attaching a second longitudinal end of the projection 310 to the blade in some examples. Direct connection between the second longitudinal end of the projection and the blade may additionally be provided if a handling rope is used.

The handling rope 420 may be attached to the hub or the nacelle. In this case, the rope 420 may be kept close to the blade, e.g. by passing the rope through an eyelet on the blade or by using a rope retaining element (an eyelet may be a rope retaining element), and it may then be routed to the hub or nacelle. In this way the projection 310 may be cling to the blade.

In some examples, the device 300 may be mounted to a wind turbine blade in a rotor already placed on top of the tower. This may be the case for performing maintenance of the wind turbine, but also for installation or commissioning. In these examples, the handling rope 420 may be attached to the projection 310 and a lifting rope may be attached to the tip fastener 410. The tip fastener may be in a closed state. By pulling the handling and lifting ropes, the tip fastener may be slid around a tip region 225 and the handling rope may be attached to the blade, hub or nacelle as explained above. The blade may be positioned vertically with the tip pointing down.

In some examples, a device 300 may also be installed on a blade before transporting the blade 22 to an installation site. The leading edge of the blade may be protected from damage during transportation.

Figure 9:
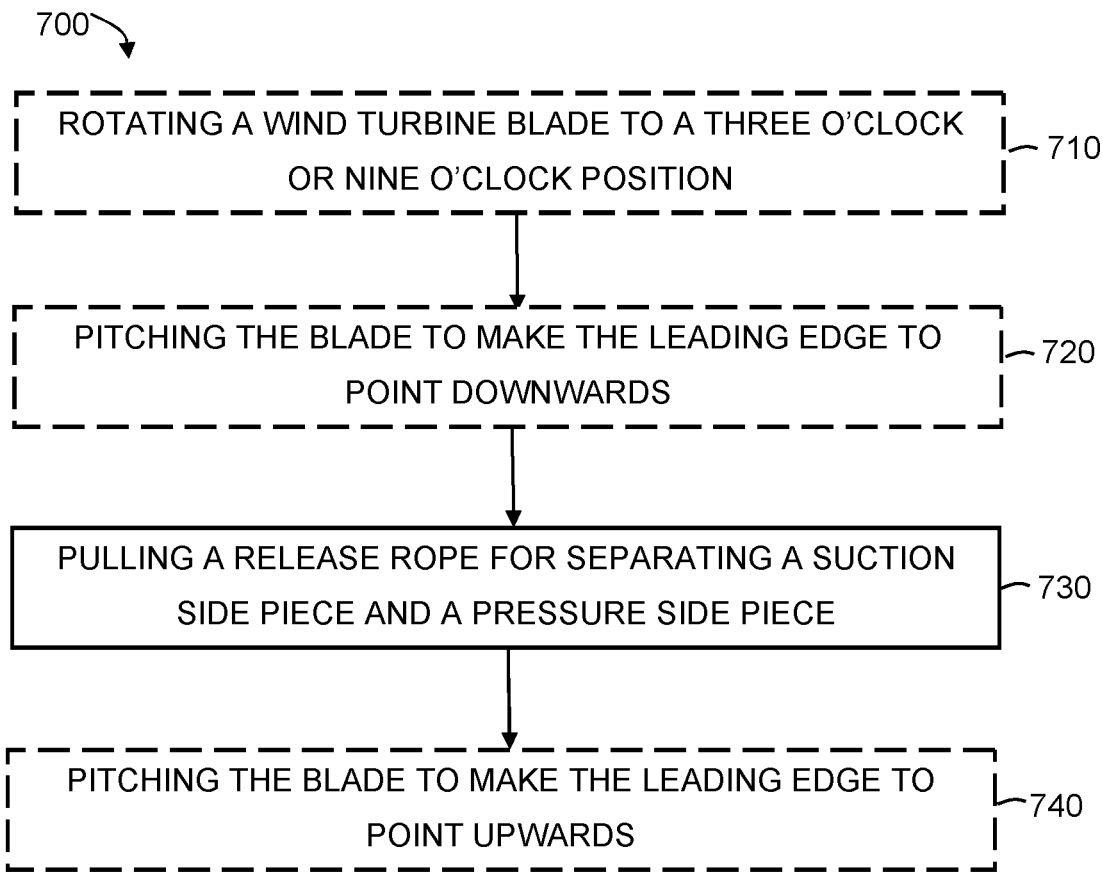
FIG. 9 schematically illustrates a flow chart of an example of how the device of FIGS. 4A and 4B may be unmounted from a wind turbine blade.

Optional steps of method 600 have been indicated by dashed lines in FIG. 9.

Any device 300 attached to a wind turbine blade 22 for avoiding or reducing vibrations when the wind turbine is parked may be detached from the blade before starting or resuming operation of the wind turbine.

The devices 300 disclosed herein may be detached in several ways from a blade before the wind turbine's operation is started or resumed.

FIG. 9 schematically illustrates a method 700 for releasing a device 300 from a wind turbine blade 22. This method may be performed after method 600. The combination of methods 600 and 700 provide a further method. The device may be in particular the one described with respect to FIGS. 4A and 4B. An example of method 700 is further illustrated in FIGS. 10A-10E. FIGS. 10A-10E show two views: a cross-sectional view of a blade 22 and a device 300 being unmounted from the blade 22 on the left side of the figures, and a corresponding side view on the right side of the figures. A blade may have one or more devices 300 attached to it.

Herein detaching comprises pulling 730 a release rope 340 for separating the pressure side 301 and suction side 302 pieces when the leading edge is pointing downwards or upwards. The blade may be in a substantially horizontal position (3 o'clock or 9 o'clock position). An example of this action is illustrated in FIG. 10B, where the leading edge 260 is pointing downwards. Before the pulling, the rope may for example extend along and between the two pieces, and it may hang from both longitudinal ends of the pieces, as shown in FIG. 10A. One of the pieces 301, 302 may include an anchor point 330, which may enable the release rope 340 to remain connected to the piece once the pressure and suction side pieces are separated, see FIGS. 10C-10E. Pulling may be performed from the ground, the hub, the nacelle or any suitable support. The pressure and suction side pieces may be separated from a tip towards a root direction of the blade in some examples.

The release rope 340 may in some examples be pulled when the leading edge 260 of the blade 22 is pointing downwards (or the trailing edge 270 pointing upwards), e.g. as illustrated in FIG. 10B. The method may comprise, see FIG. 10A, placing a blade 22 with the trailing edge 270 pointing upwards, e.g. vertically upwards. Pulling the release rope 340 may also be performed with the blade in a three or nine o'clock position. This or a close to a horizontal position of the blade may help to stabilize the device on the blade and control better its release. If not in a substantially horizontal and/or with the trailing edge 270 pointing upwards, the blade may be moved to one or both of them.

For example, the blade may be first positioned in a three or nine o'clock position at block 710 and then pitched at block 720 to make the trailing edge to point upwards. Then, the pressure and suction side pieces may be separated by pulling the release rope 340 at block 730. The optional steps have been marked by dashed lines in FIG. 9.

Once the suction and pressure side pieces 301, 302 are separated, the trailing edge 270 of the wind turbine blade 22 may be made to point downwards at block 740, e.g. vertically downwards. The blade may be pitched to this end. The device 300 may fall by the action of gravity and the release rope 340 may help to control the descent of the device 300, see FIGS. 10D and 10E. If gravity is not enough to make the device 300 to fall, pulling the rope 340 may help to release the device 300 from the blade 22. Problems of the device getting stuck with serrations may also be prevented in this way.

In some other examples, the method may start by pulling the release rope 340 when the trailing edge of the blade 270 is pointing downwards, e.g. vertically downwards. The blade may also be in a horizontal (three or nine o'clock) position. For example, the blade may be placed in a three or nine o'clock position and then pitched for making the trailing edge 270 to point vertically downwards, similarly to FIG. 10D. The release rope 340 may be pulled and the suction 301 and pressure 302 side pieces separated. Gravity, or gravity and pulling the release rope 340, may cause the device 300 to separate from the blade 22 and fall.

In some other examples where a trailing edge piece 320 is present, the removable attachment 315 may be located in the trailing edge piece 320. In these examples, the pressure and suction side pieces may be non-detachably connected or detachably connected. The release rope 340, when pulled, may then separate the trailing edge piece 320 in two portions. Gravity may help the device 300 to fall from the blade 22.

Figure 11:
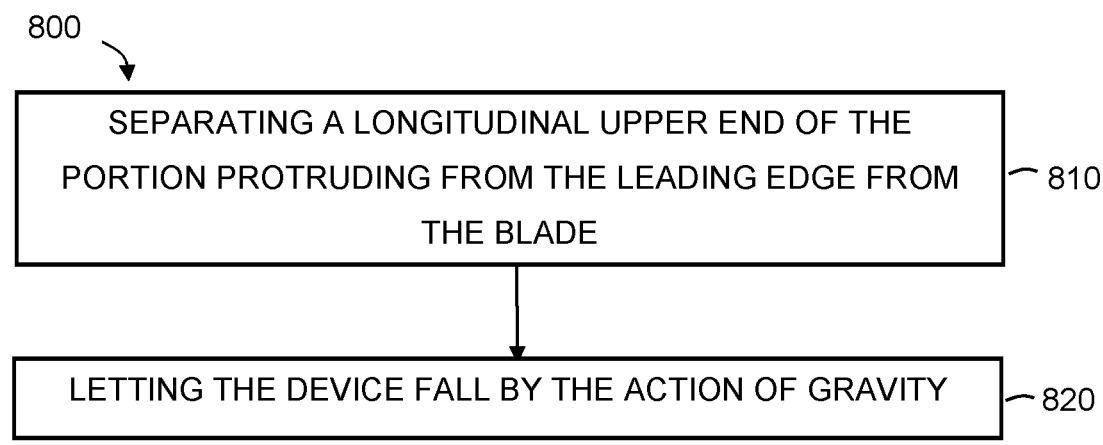
FIG. 11 schematically illustrates a flow chart of an example of how the device of FIGS. 5A and 5B may be unmounted from a wind turbine blade.

FIG. 11 schematically illustrates a method 800 for releasing a device 300 from a wind turbine blade 22. Method 800 may be applied after method 600. The combination of methods 600 and 800 provide a further method. The device may be in particular the one described with respect to FIGS. 5A and 5B.

Herein detaching comprises, at block 810, separating a longitudinal end 312 of the portion configured to protrude beyond the leading edge 310 from the blade 22. The end 312 may be called upper end in some examples and may be understood as the end which is at a highest altitude, e.g. with respect to the ground.

Separating may be performed when the blade 22 is pointing downwards, e.g. vertically downwards (six o'clock position). The blade may be put in this position before separating the projection 310, e.g. its upper end, from the blade 22. With the blade in this position, the upper end would be the end closest to the root of the blade.

Separating may comprise unfastening a root fastener 415 or unfastening a handling rope 420. At block 820, the method comprises letting the device 300 fall by the action of gravity. The tip fastener 410 may slid downwards when the root fastener or the handling rope have been released. The handling rope may be unfastened from a nacelle or a hub in some examples.

A rope may be attached to a tip fastener 410 before detaching the upper part of the device 300 and letting the device fall. A rope may be additionally or alternatively attached to a root fastener 415 before releasing the upper end of the device. The rope(s) may help to control the lowering and collection of the device.

In some other examples, the tip fastener 410 may be unfastened for separating the portion 310 from the blade. For example, the root and the tip fasteners may be unfastened for unmounting device 300.

When reference is made to placing a wind turbine in a certain position (e.g. in a three, six or nine o'clock position), it is understood that such step is to be omitted if the blade is by whatever reason already in that position.

For reasons of completeness, various aspects of the present disclosure are set out in the following numbered clauses:

Clause 1. A device (300) configured to be removably mounted to a wind turbine blade (22) having a root (210), a tip (220) and exterior surfaces extending in a generally spanwise direction from the root (210) to the tip (220) and defining a pressure side (240), a suction side (250), a leading edge (260) and a trailing edge (270), each surface;
the device (300) being configured for mitigating vibrations of a wind turbine (10) when a rotor (18) of the wind turbine (10) is in standstill;
the device (300) comprising a portion (310) configured to protrude beyond the leading edge (260) in a local chordwise direction of the wind turbine blade (22); and
the device (300) being configured to be attached around the wind turbine blade (22) substantially along a local chordwise direction.

Clause 2. The device of clause 1, wherein the device (300) comprises a suction side piece (301) configured to be arranged on the suction side (250) of the wind turbine blade (22) and a pressure side piece (302) configured to be arranged on the pressure side (240), both of the suction side and pressure side pieces (301, 302) comprising a portion (306, 307, 310) configured to protrude beyond the leading edge (260).

Clause 3. The device of clause 2, wherein the portions (306, 307, 310) configured to protrude beyond the leading edge (260) have sharp edges.

Clause 4. The device of any of clauses 2-3, comprising a gap (305) between the portions (306, 307, 310) configured to protrude beyond the leading edge (260) of the suction side and the pressure side pieces (301, 302) when attached to a wind turbine blade (22).

Clause 5. The device of any of clauses 2-4, further comprising one or more straps (325) connecting the suction side piece (301) and the pressure side piece (302).

Clause 6. The device of any of clauses 2-5, further comprising a trailing edge piece (320).

Clause 7. The device of clause 6, wherein the trailing edge piece (320) is rounded.

Clause 8. The device of clause 1, further comprising a tip fastener (410) attached or attachable to a first longitudinal end (311) of the portion (310) configured to protrude beyond the leading edge (260), wherein the portion (310) configured to protrude beyond the leading edge (260) is configured to extend from the tip fastener (410) along the leading edge (260).

Clause 9. The device of clause 8, further comprising a handling rope (420) attached or attachable to a second longitudinal end (312) of the portion (310) configured to protrude beyond the leading edge (260).

Clause 10. The device of clause 8, further comprising a root fastener (415) attached or attachable to a second longitudinal end (312) of the portion (310).

Clause 11. The device of clause 9, further comprising a root fastener (415) attached or attachable to the handling rope (420).

Clause 12. A wind turbine blade (22) comprising a device (300) according to any of clauses 1-20 attached to the blade (22).

Clause 13. A wind turbine (10) comprising one or more blades (22) according to clause 12.

Clause 14. A method (500) for mitigating vibrations of a parked wind turbine (10) comprising one or more wind turbine blades (22), a wind turbine blade (22) having a root (210), a tip (22) and exterior surfaces extending in a generally spanwise direction from the root (210) to the tip (220) and defining a pressure side (240), a suction side (250), a leading edge (260) and a trailing edge (270); the method comprising:
releasably attaching (510) a device (300) around a wind turbine blade (22) along a local chordwise direction,
the device (300) comprising a portion (310) configured to protrude beyond the leading edge (260) in a local chordwise direction.

Clause 15. The method of clause 14, wherein releasably attaching (510) comprises at least one of surrounding the wind turbine blade (22) with the device (300) and sliding the device (300) around the wind turbine blade (22).

Clause 16. The method of clause 15, wherein surrounding comprises joining a suction side piece (301) and a pressure side piece (302) via removable attachment (315) along the leading edge (260).

Clause 17. The method of clause 16, further comprising arranging the device (300) on top of a trailing edge (270) which points upwards, such that a suction side piece (301) is placed in the suction side (250) of the blade (22), and a pressure side piece (302) is placed in the pressure side (240) of the blade (22).

Clause 18. The method of any of clauses 16-17, further comprising passing a release rope (340) through an anchor point (330) of the device (300) and between the suction and pressure side pieces (301, 302).

Clause 19. The method of clause 15, wherein a tip fastener (410) is arranged around a tip region (225) of the blade (22) for attaching a first longitudinal end (311) of the portion (310).

Clause 20. The method of clause 19, wherein the tip fastener (410) is fastened or slid around the tip region (225).

Clause 21. The method of any of clauses 19-20, further comprising joining a second longitudinal end (312) of the portion (310) to a central or a root region (24) of the blade (22).

Clause 22. The method of any of clauses 19-21, further comprising pulling a handling rope (422) attached to a second longitudinal end (312) of the portion (310).

Clause 23. The method of clause 22, further comprising lowering the handling rope (422) from a hub (20) or a nacelle (16).

Clause 24. The method of any of clauses 22-23, further comprising attaching the handling rope (420) to a hub (20) or a nacelle (16).

Clause 25. The method of any of clauses 14-24, further comprising detaching the device (300) from the blade (22) before the wind turbine (10) starts to operate.

Clause 26. The method of clause 24, wherein detaching comprises separating a longitudinal end (312) of the device (300) close to a root region (24) of the blade (22) from the blade (22).

Clause 27. The method of any of clauses 24-25, wherein the blade (22) is pointing downwards.

Clause 28. The method of any of clauses 25-26, wherein separating comprises unfastening a root fastener (415) or a handling rope (420).

Clause 29. The method of any of clauses 25-26, wherein the device (300) falls by the action of gravity after the longitudinal end (312) close to a root region (24) of the blade (22) has been detached.

Clause 30. A method (700) for detaching a device (300) from a leading edge (260) of a wind turbine blade (22), the device (300) comprising a suction side piece (301) and a pressure side piece (302), each of the pressure and suction side pieces (301, 302) including a portion (306, 307, 310) configured to protrude substantially in a local chordwise direction beyond the leading edge (260) of a wind turbine blade (22), and the method comprising:
pulling (730) a release rope (340) for separating the pressure side and suction side pieces (302, 301) when the leading edge (260) of the blade (22) is pointing downwards or upwards before starting to operate the wind turbine (10).

Clause 31. The method of clause 30, wherein the release rope (340) is pulled when the blade (22) is in a three or nine o'clock position.

Clause 32. The method of any of clauses 30-31, wherein the device (300) falls by the action of gravity once the pressure and suction side pieces (302, 301) are separated.

Clause 33. The method of any of clauses 29-31, further comprising, if the leading edge (260) is pointing downwards when separating the pressure side and suction side pieces (302, 301), causing the leading edge (260) to point upwards.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A device (300) configured to be removably mounted to a wind turbine blade (22) having a root (210), a tip (220) and exterior surfaces extending in a spanwise direction from the root (210) to the tip (220) and defining a pressure side (240), a suction side (250), a leading edge (260) and a trailing edge (270),
the device (300) being configured for mitigating vibrations of a wind turbine (10) when a rotor (18) of the wind turbine (10) is in standstill,
the device (300) comprising a portion (310) configured to protrude beyond the leading edge (260) in a local chordwise direction,
the device (300) being configured to be attached around the wind turbine blade (22) along the local chordwise direction, and
wherein the device further comprises a suction side piece (301) configured to be arranged on the suction side (250) of the wind turbine blade (22) and a pressure side piece (302) configured to be arranged on the pressure side (240) of the wind turbine blade (22), the suction side piece (301) being removably attachable to the pressure side piece (302).

2. The device of claim 1, wherein both of the suction side and pressure side pieces (301, 302) comprise a portion (306, 307, 310) configured to protrude beyond the leading edge (260).

3. The device of claim 2, wherein the portions (306, 307, 310) configured to protrude beyond the leading edge (260) have beveled edges.

4. The device of claim 2, comprising a gap (305) between the portions (306, 307, 310) configured to protrude beyond the leading edge (260) of the suction side and the pressure side pieces (301, 302) when attached to the wind turbine blade (22).

5. The device of claim 2, further comprising one or more straps (325) connecting the suction side piece (301) and the pressure side piece (302).

6. The device of claim 1, further comprising a tip fastener (410) attached or attachable to a first longitudinal end (311) of the portion (310) configured to protrude beyond the leading edge (260), wherein the portion (310) configured to protrude beyond the leading edge (260) is configured to extend from the tip fastener (410) along the leading edge (260).

7. The device of claim 6, further comprising a handling rope (420) attached or attachable to a second longitudinal end (312) of the portion (310) configured to protrude beyond the leading edge (260).

8. The device of claim 7, further comprising a root fastener (415) attached or attachable to the handling rope (420).

9. The device of claim 6, further comprising a root fastener (415) attached or attachable to a second longitudinal end (312) of the portion (310).

10. A wind turbine blade (22) comprising a device (300) according to claim 1 attached to the wind turbine blade (22).

11. A method (500) for mitigating vibrations of a parked wind turbine (10) comprising one or more wind turbine blades (22), the wind turbine blades (22) having a root (210), a tip (22) and exterior surfaces defining a pressure side (240), a suction side (250), a leading edge (260) and a trailing edge (270), extending in a spanwise direction from the root (210) to the tip (220), the method comprising:
releasably attaching (510) a device (300) around a wind turbine blade (22) along a local chordwise direction, wherein the device (300) comprises a portion (310) configured to protrude beyond the leading edge (260) of the wind turbine blade (22) in the local chordwise direction, and wherein the device further comprises a suction side piece (301) configured to be arranged on the suction side (250) of the wind turbine blade (22) and a pressure side piece (302) configured to be arranged on the pressure side (240) of the wind turbine blade (22), the suction side piece (301) being removably attachable to the pressure side piece (302).

12. The method of claim 11, wherein the step of releasably attaching (510) the device (300) around the wind turbine blade (22) comprises at least one of surrounding the wind turbine blade (22) with the device (300) and sliding the device (300) around the wind turbine blade (22).

13. The method of claim 12, wherein the step of surrounding comprises joining the suction side piece (301) and the pressure side piece (302) via a removable attachment (315) along the leading edge (260).

14. The method of claim 13, further comprising arranging the device (300) on top of a trailing edge (270) which points upwards, such that a suction side piece (301) is placed in the suction side (250) of the wind turbine blade (22), and a pressure side piece (302) is placed in the pressure side (240) of the wind turbine blade (22).

15. The method of claim 11, further comprising detaching the device (300) from the wind turbine blade (22) before the wind turbine (10) starts to operate.

16. A device (300) configured to be removably mounted to a wind turbine blade (22) having a root (210), a tip (220) and exterior surfaces extending in a spanwise direction from the root (210) to the tip (220) and defining a pressure side (240), a suction side (250), a leading edge (260) and a trailing edge (270),
the device (300) being configured for mitigating vibrations of a wind turbine (10) when a rotor (18) of the wind turbine (10) is in standstill,
the device (300) comprising a portion (310) configured to protrude beyond the leading edge (260) in a local chordwise direction,
the device (300) being configured to be attached around the wind turbine blade (22) along the local chordwise direction,
wherein the device (300) comprises a suction side piece (301) configured to be arranged on the suction side (250) of the wind turbine blade (22) and a pressure side piece (302) configured to be arranged on the pressure side (240) of the wind turbine blade (22), wherein both of the suction side and pressure side pieces (301, 302) comprise a portion (306, 307, 310) configured to protrude beyond the leading edge (260), and wherein the portions (306, 307, 310) each have beveled edges.

* * * * *